United States Patent [19]

Kohn

[11] Patent Number: 4,536,427

[45] Date of Patent: Aug. 20, 1985

[54] SCRIMLESS CONTOURABLE CORE FOR USE IN LAMINATED CONTOURED STRUCTURES

[75] Inventor: Henri-Armand Kohn, Northvale, N.J.

[73] Assignee: Baltek Corp., Northvale, N.J.

[21] Appl. No.: 593,130

[22] Filed: Mar. 26, 1984

[51] Int. Cl.³ .......................... B32B 3/10; B32B 7/08; B32B 31/00

[52] U.S. Cl. ........................................ 428/44; 428/52; 428/53; 428/58; 428/194; 156/196; 156/250; 156/264; 156/265; 144/349; 144/351; 114/357; 114/358

[58] Field of Search .................. 52/785; 144/349, 351; 114/357, 358; 156/196, 250, 264, 265, 363; 428/53, 54, 55, 44

[56] References Cited

U.S. PATENT DOCUMENTS

| | | | |
|---|---|---|---|
| 3,107,708 | 10/1963 | Savage | 144/349 X |
| 3,298,892 | 1/1967 | Lippay | 428/53 |
| 3,540,967 | 11/1970 | Shook et al. | 156/250 X |
| 3,867,238 | 2/1975 | Johannsen | 428/53 |
| 4,119,750 | 10/1978 | Porter | 114/357 X |

Primary Examiner—Joseph L. Schofer
Assistant Examiner—Fred M. Teskin
Attorney, Agent, or Firm—Michael Ebert

[57] ABSTRACT

A light-weight contourable core of high strength for inclusion in boat hulls in which the core is sandwiched between facing sheets of resin-reinforced fiberglass. The core is formed by a planar array of block-like modules made of end-grain balsa wood or other material having acceptable properties whose adjacent edges are held together by flexible adhesive joints that have a short elastic limit, such that when the planar core is pressed against a contoured surface for lamination thereto, the resultant stresses cause the joints to stretch beyond their elastic limit to an extent necessary to permit the modules to conform to this surface. There is no spring back when the pressure is released, and the modules, therefore, maintain their conformed positions.

8 Claims, 8 Drawing Figures

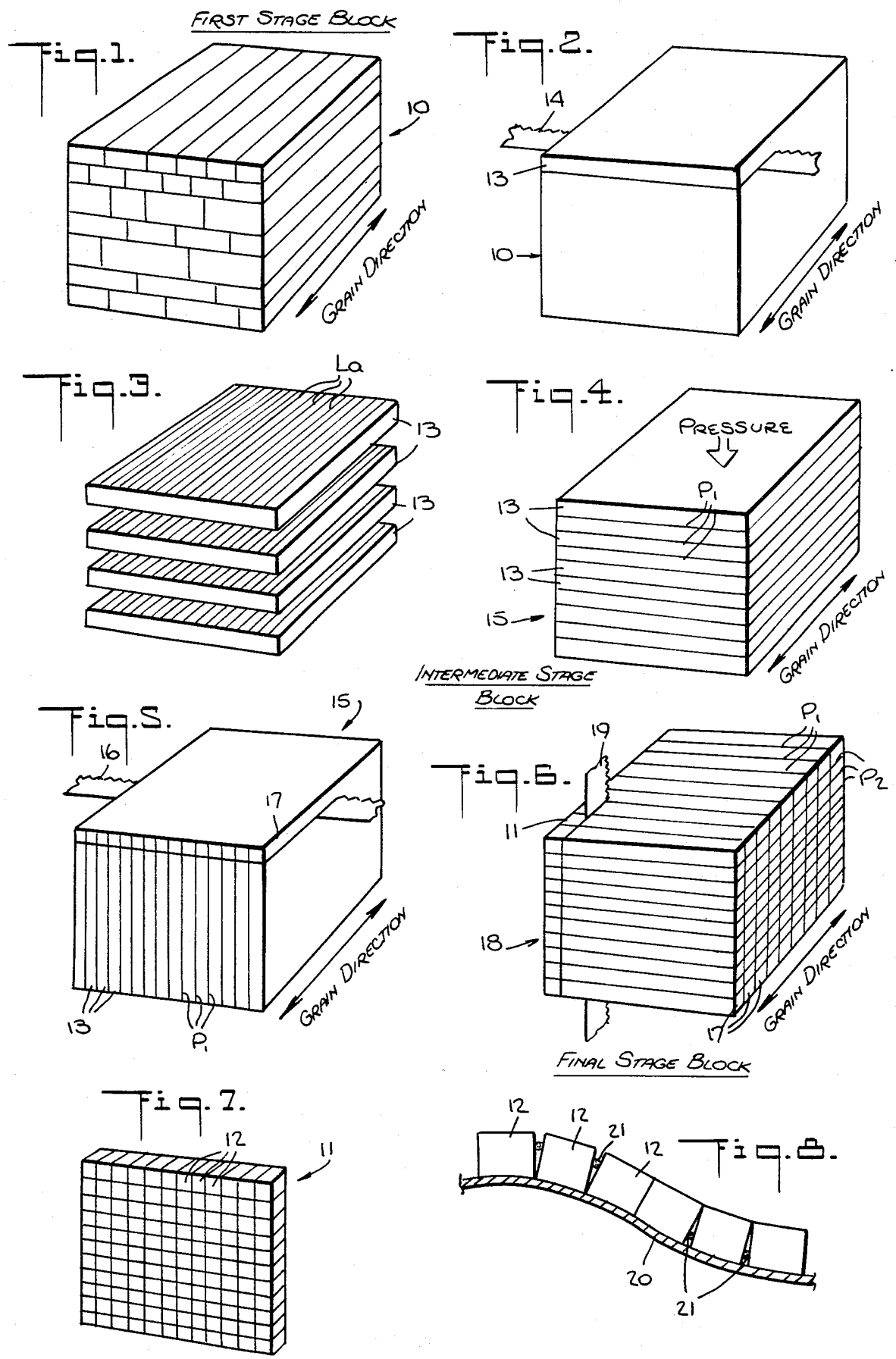

SCRIMLESS CONTOURABLE CORE FOR USE IN LAMINATED CONTOURED STRUCTURES

BACKGROUND OF INVENTION

Field of Invention

This invention relates generally to light-weight cores of high strength for inclusion in laminated structures, and more particularly to a contourable core formed of a planar array of block-like modules made of end-grain balsa wood or other material whose adjacent edges are held together at their adjacent edges by flexible adhesive joints, and to a technique for fabricating such cores.

A technique for fabricating cores in accordance with the invention, though applicable to various species of wood, is of particular value in connection with balsa wood derived from a tropical American tree (*Ochroma pyramida*). Balsa wood has outstanding properties unique in the lumber field; for on the average, it weighs less than 9 pounds per cubic foot, this being 40% less than the lightest North American species. Its cell structure affords a combination of high rigidity and compressive and tensile strength superior to any composite or synthetic material of equal or higher density. While a technique in accordance with the invention will be described herein only in regard to balsa wood, it is to be understood that it is also applicable to many other wood species, as well as to rigid foam plastic and other materials having acceptable properties in the context of laminated structures.

The market potential for balsa wood is considerable; for useful structural sandwich laminates can be created by bonding thin facings or skins to balsa wood panels which function as a core. Thus the Kohn et al. U.S. Pat. No. 3,325,037 and the Lippay U.S. Pat. No. 3,298,892 disclose structural sandwich laminates whose core is formed of end-grain balsa wood, the laminates having an exceptionally high strength-to-weight ratio as well as excellent thermal insulation properties.

End-grain balsa-cored sandwich laminates are widely used in transportation and handling equipment, such as for floors for railroad cars, shipping containers, cargo pallets, bulkheads, doors, reefer bodies, as well as in a wide variety of other applications. These laminates are also employed for structural insulation in aircraft applications, housing and in boating.

Where the structure to be reinforced is constituted by planar surfaces, the balsa core may simply be a solid board or panel laminated to the facings. But in the case of hulls and other structures having single or double curvatures, or other complex contours, it is ordinarily not possible to conform solid balsa to the contoured surface without bending the balsa panel, and this involves difficult, time-consuming and expensive procedures.

As noted in the Shook U.S. Pat. No. 3,540,967, contourable balsa blankets have been developed that are composed of small individual balsa blocks cut from a board. The blocks are attached to a common carrier, such as a fabric scrim, whereby the blanket may readily be conformed to a curved surface for lamination thereto.

Such blankets, which are commercially available from the Baltek Corporation of Northvale, N.J., under the trademark "Contourkore," are useful in the construction of reinforced plastic boats and larger vessels, for they lend themselves to lamination between layers of resin-reinforced fiberglass or other plastic material, thereby bringing about a distribution of weight favorable to high stability and buoyancy, as well as imparting stiffness to the structure.

As pointed out in the above-identified Kohn et al. and Lippay patents, quite apart from the structural merits of balsa, this wood is of particular value in cryogenic applications, for it has a low coefficient of expansion and hence deforms only slightly under severe temperature changes. Moreover, the k-factor of balsa wood is such as to render this material highly suitable as thermal insulation. The symbol for thermal conductivity is the k-factor, this being the amount of heat expressed in BTU's transmitted in one hour through one square foot of homogeneous material, one inch thick, for each degree of Fahrenheit of temperature difference between opposed surfaces of the material.

The above-noted Shook patent discloses a contourable blanket having an array of end-grain balsa wood blocks attached by pressure-releasable adhesive lines to a fabric scrim made of a non-woven, open-mesh material of fiberglass or other nonstretchable yarns of high tensile strength. Because of the open mesh, the surfaces of the blocks are almost fully exposed to facilitate lamination. On the other hand, the stability of the scrim maintains the balsa blocks or modules at their assigned positions in the planar array thereof and prevents overlapping thereof during handling. Because fiberglass is wettable, it may be effectively bonded by standard resins and other adhesive agents both to the blocks and to the laminating plies.

When the blanket is laid down on a contoured surface for lamination thereto with the scrim facing out, and the blocks are then pressed into conformity with the surface by a roller or other means, each block will assume an orientation determined by the surface engaged thereby. Where the orientation of a block varies from that of the adjacent block as will occur in complex curvatures, the block will then partially detach itself from the scrim to the extent necessary to assume the desired orientation. Thus for a given contoured surface, selected blocks in the blanket are detached partially from the scrim, such detachment being facilitated by the adhesive line connections which permit release when pressure is applied to the block.

In working for many years with Contourkore blankets, we have found that whereas one obtains reasonably good bonding in the interface between the scrim side of the blanket and a facing ply or sheet laminated thereto, one achieves better bonding in the interface between the naked side of the blanket and the facing sheet laminated to this side. Since the strength of the resultant laminated structure depends in good part on the strength of the bonds between the core and the facing sheets, the relative weakness of the scrim side bonding line represents a negative factor.

Another factor which militates against a contourable scrim blanket is that because the scrim is attached to the balsa wood blocks on one side thereof, it creates an unbalanced structure; for if the wood swells because of a change in its moisture content, it is restrained only on the scrim side and not on the naked side. As a consequence, Contourkore blankets are subject to warping, which makes it difficult in some instances to hold it down on a resin-coated contoured surface when this coating is in the wet, uncured state.

Yet another drawback of a scrim blanket is that because the flexible scrim is non-stretchable, the blanket is conformable to a contoured surface whose curvature extends in one direction only. But if the contoured surface has a curvature running in the longitudinal direction as well as a curvature running in the transverse direction, the scrim blanket can be bent to conformity in only one of these directions, for the scrim then resists conformity in the other direction.

SUMMARY OF INVENTION

In view of the foregoing, the main object of this invention is to provide a scrimless contourable core for use in a laminated structure, which core is constituted by a planar array of modules held together at their adjacent edges by flexible adhesive joints.

By "modules" is meant end-grain balsa wood blocks or blocks of other materials, such as rigid foam plastic, having properties which are acceptable in the context of a core for inclusion in a laminate. The invention is not limited to a particular module material.

A significant advantage of a scrimless core in accordance with the invention is that one may obtain therewith secure, high quality bonds to facing sheets on both sides of the core and thereby create a structural laminate of high strength. Another feature of the invention is that the scrimless core, because it is unrestrained on both sides, is not subject to warping as a result of a change in moisture content.

More particularly, it is an object of the invention to provide a scrimless contourable core which is bendable in any direction so that the core can be draped over and conformed to contoured surfaces having compound curves.

Also an object of the invention is to provide a technique for fabricating a scrimless, contourable core of the above type which makes it possible to mass produce such cores and at relatively low cost. Another advantage of the invention is that because the core is scrimless, it may be sanded or otherwise finished on both sides.

Briefly stated, these objects are attained in a lightweight contourable core of high strength for inclusion in boat hulls in which the core is sandwiched between facing sheets of resin-reinforced fiberglass. The core is formed by a planar array of block-like modules made of end-grain balsa wood or other material having acceptable properties whose adjacent edges are held together by flexible adhesive joints that have a short elastic limit, such that when the planar core is pressed against a contoured surface for lamination thereto, the resultant stresses cause the joints to stretch beyond their elastic limit to an extent necessary to permit the modules to conform to this surface. There is no spring back when the pressure is released, and the modules, therefore, maintain their conformed positions.

OUTLINE OF DRAWINGS

For a better understanding of the invention as well as other objects and further features thereof, reference is made to the following detailed description to be read in conjunction with the accompanying drawings, wherein:

FIG. 1 shows, in perspective, a basic first stage block of balsa wood which is to be processed by a technique in accordance with the invention to produce a scrimless core;

FIG. 2 illustrates how the first stage block is sawed in the horizontal plane in its grain direction to produce flat grain panels;

FIG. 3 shows how parallel lines of adhesive are applied to the faces of the flat grain panels;

FIG. 4 illustrates an intermediate stage block produced by joining together the adhesive-coated flat grain panels;

FIG. 5 shows the intermediate stage block sawed in the horizontal plane in its grain direction to produce flat grain panels;

FIG. 6 illustrates a final stage block formed by applying adhesive lines to the faces of the flat-grain panels derived from the intermediate block and joining them together, the final stage block being then sawed in the vertical plane normal to the grain direction to produce end-grain cores formed by an array of modules;

FIG. 7 is a perspective view of the core; and

FIG. 8 illustrates how the core modules accommodate themselves to a contoured surface.

DESCRIPTION OF INVENTION

Referring now to FIG. 1, there is shown a large basic or first stage block 10 of balsa wood whose grain direction, as indicated by the arrow, extends in the horizontal plane. This block is formed by interfitted pieces or sectors of the wood which are joined together in the manner disclosed, for example, in the patents to Jean Kohn, U.S. Pat. Nos. 4,122,878 and 4,301,202. The present invention is in no way concerned with how the basic wood block is created and use may be made of wood blocks created by the techniques disclosed in the Sorenson U.S. Pat. No. 781,376, the Anderson U.S. Pat. No. 2,878,844, and the Hasenwinkle U.S. Pat. Nos. 3,903,943; 3,961,644 and 3,989,078.

We shall now set out the successive steps by which the first stage block 10 shown in FIG. 1 is processed to produce a scrimless contourable core. This core 11, as shown in FIG. 7, is formed by a rectangular array of individual end-grain balsa wood blocks or modules 12 which are joined together at their adjacent edges by adhesive joints that have a short elastic limit.

Step 1:

The first step is to saw the basic block 10 into a plurality of like flat-grain panels 13 by means of a bandsaw 14 which operates in the horizontal plane in the grain direction. Thus the fibers in the resultant panels run substantially parallel to the faces thereof, as distinguished from an endgrain panel in which the fibers are normal to the faces. The number of panels per basic block depends, of course, on the height of the block and on the desired thickness of the panels.

The thickness of these panels is determined by the desired edge dimensions of the core modules 12, and may be 1½ inches or whatever other dimension is preferred.

Step 2:

The flat-grain panels 13 then have applied to one face thereof parallel lines or bands of adhesive La as shown in FIG. 3. In practice, this may be done by conveying the panels against a coating roll which engages a printing roll formed with a series of circumferential grooves. The printing roll, in turn, engages a transfer roll that rotates in an adhesive bath. The adhesive material which coats the entire surface of the transfer roll is received within the grooves in the printing roll, thereby forming rings of adhesive material on the coating roll which are applied as parallel lines or bands onto the panels.

While the adhesive is preferably applied as lines or bands on each panel, in practice other adhesive patterns may be used or the entire surface if the panel may be coated with adhesive having the required characteristics.

The adhesive selected for this purpose must be compatible with or have no adverse effect on the unusual polyester and epoxy matrices used in sandwich structures. One essential requirement of the adhesive which serves as a bonding agent joining the adjacent edges of the core modules is that the adhesive have elastic properties, so that when adjacent modules are subjected to stress and pulled apart, the adhesive then stretches to permit this action. The second essential requirement is that the elastic adhesive have a very short elastic limit so that when it is stretched even to a slight extent, this takes it beyond its elastic limit and the adhesive bond then does not spring back to recover its original form when the stress is relieved. Thus the adhesive has taffy-like characteristics; for when it is stretched, it remains stretched.

Step 3:

The adhesive-coated flat-grain panels 13 are then brought together, as shown in FIG. 4, and subjected to pressure until the adhesive cures, thereby creating an intermediate stage block 15 in which the flat-grain panels are bonded together, the adhesive being in a first set of parallel planes $P_1$.

Step 4:

The intermediate stage block 15 is then sliced by a band saw 16 which saws the block in the horizontal plane in the grain direction at right angles to the adhesive plane $P_1$ to form a plurality of flat-grain panels 17. Each of these flat-grain panels is composed of parallel strips which are bonded together by adhesive.

Step 5

The flat-grain panels 17 resulting from step 4 are adhesively coated in the same manner illustrated in FIG. 3 and these adhesively coated panels are then joined together under pressure to produce a final stage block 18, as shown in FIG. 6, having a second set of adhesive planes $P_2$ right angles to the first set of adhesive planes $P_1$.

Step 6:

The final stage block 18 is then sliced into end-grain cores 11 by means of a bandsaw 19 which saws in the vertical plane normal to the grain direction. Thus each core 11, as shown in FIG. 7, is constituted by a rectangular array of end-grain blocks or modules 12 which are adhesively bonded together at their adjacent edges.

As shown in FIG. 8, when the scrimless core is pressed against a contoured surface 20, each module 12 then accommodates its position relative to the adjacent module so that it conforms to the curvature of the surface. The adhesive bond 21 between the adjacent edges of the modules yields to the extent necessary to permit the modules to assume positions dictated by the curvature of the surface. But since the adhesive is stretched beyond its elastic limit, there is no spring-back; and once a module assumes its proper position, it remains at that position.

Because the core 11 is scrimless, it may be sanded and otherwise finished on both sides to provide the desired dimensions as well as smooth surfaces. Sanding also serves to somewhat close the pores of the end-grain balsa and thereby limit the degree to which resin will impregnate the pores in the course of lamination. Also, the sides may be coated with a sealant to close the pores without interfering with the action of laminating resins or epoxies.

Preferred Adhesives:

Usable as an adhesive having a short elastic limit as required by the invention is a latex base emulsion such as Universal Adhesive No. 10-3150 or H. B. Fuller No. L-522.

While there has been shown and described a preferred embodiment of a scrimless contourable core for use in laminated contoured structures in accordance with the invention, it will be appreciated that many changes and modifications may be made therein without, however, departing from the essential spirit thereof.

I claim:

1. A scrimless contourable core for inclusion in laminated structures, said core comprising a planar array of four-sided identical rectangular modules formed of end-grain balsa wood, all of whose adjacent sides are held together by flexible joints of taffy-like adhesive that has a short elastic limit, such that when the outer face of the planar core is pressed against a contoured surface for lamination of the inner face thereto, the resultant stresses cause adjacent modules of the core to pull apart and to cause the joints therebetween to stretch beyond their elastic limit to an extent necessary to conform the pulled-apart modules to this surface without spring-back when the stresses are relieved.

2. A core as set forth in claim 1, wherein said modules are formed of rigid foam plastic.

3. A core as set forth in claim 1, wherein said adhesive on the edges is constituted by parallel lines thereof.

4. The method of converting a relatively large first stage block into a plurality of scrimless contourable cores each constituted by a planar array of four-sided rectangular modules whose adjacent sides are held together by flexible joints of a taffy-like adhesive that has a short elastic limit, said method comprising the steps of:

A. sawing the first stage block to produce individual panels which are then separately coated with a taffy-like adhesive having a short elastic limit and are joined together under pressure to form an intermediate stage block having parallel adhesive planes;

B. sawing the intermediate block in a direction normal to said adhesive planes to produce individual panels which are then separately coated with said adhesive and joined together under pressure to form a final stage block; and C. sawing said final stage block in the longitudinal direction to create said plurality of scrimless cores.

5. The method as set forth in claim 4, wherein said first stage block is formed of end-grain balsa and is sawed in the grain direction, whereby the resultant intermediate panels are flat-grain panels.

6. The method as set forth in claim 4, wherein said sawing is effected by band saws.

7. The method as set forth in claim 4, wherein said adhesive is coated on the panels in the form of parallel lines thereon.

8. The method as set forth in claim 4, wherein said first stage block is formed of rigid foam plastic material.

* * * * *